Dec. 15, 1931.  H. PERROT  1,837,133
BRAKE MECHANISM
Filed Feb. 4, 1926  2 Sheets-Sheet 1

INVENTOR
HENRI PERROT
BY
ATTORNEY

Dec. 15, 1931.  H. PERROT  1,837,133
BRAKE MECHANISM
Filed Feb. 4, 1926   2 Sheets-Sheet 2

INVENTOR
HENRI PERROT
BY
ATTORNEY

Patented Dec. 15, 1931

1,837,133

UNITED STATES PATENT OFFICE

HENRI PERROT, OF PARIS, FRANCE, ASSIGNOR, BY MESNE ASSIGNMENTS, TO BENDIX AVIATION CORPORATION, OF NEW YORK, N. Y., A CORPORATION OF DELAWARE

BRAKE MECHANISM

Application filed February 4, 1926. Serial No. 85,974.

This invention relates to brakes, and to operating mechanism used in applying brakes, and is illustrated as embodied in front wheel automobile brakes and operating mechanism therefor.

One important feature relates to the use of a novel universal joint, suitable for use in the swivelling axis of the wheel for operating a brake on the wheel. In one desirable arrangement, the joint includes a spherical connecting member having two grooves at right angles to each other to receive pairs of projections on the adjacent shaft ends, the grooves being flattened to permit assembly and dismounting of the joint in a novel manner even though the projections curved more than 180°.

Other features of novelty, including a novel arrangement for clamping in place the bearing for the shaft operated by the universal joint, an improved brake drum construction, an efficient but inexpensive one-piece brake-applying device, and other novel combinations of parts and desirable particular constructions, will be apparent from the following description of two illustrative embodiments shown in the accompanying drawings, in which.

Figures 1, 2:
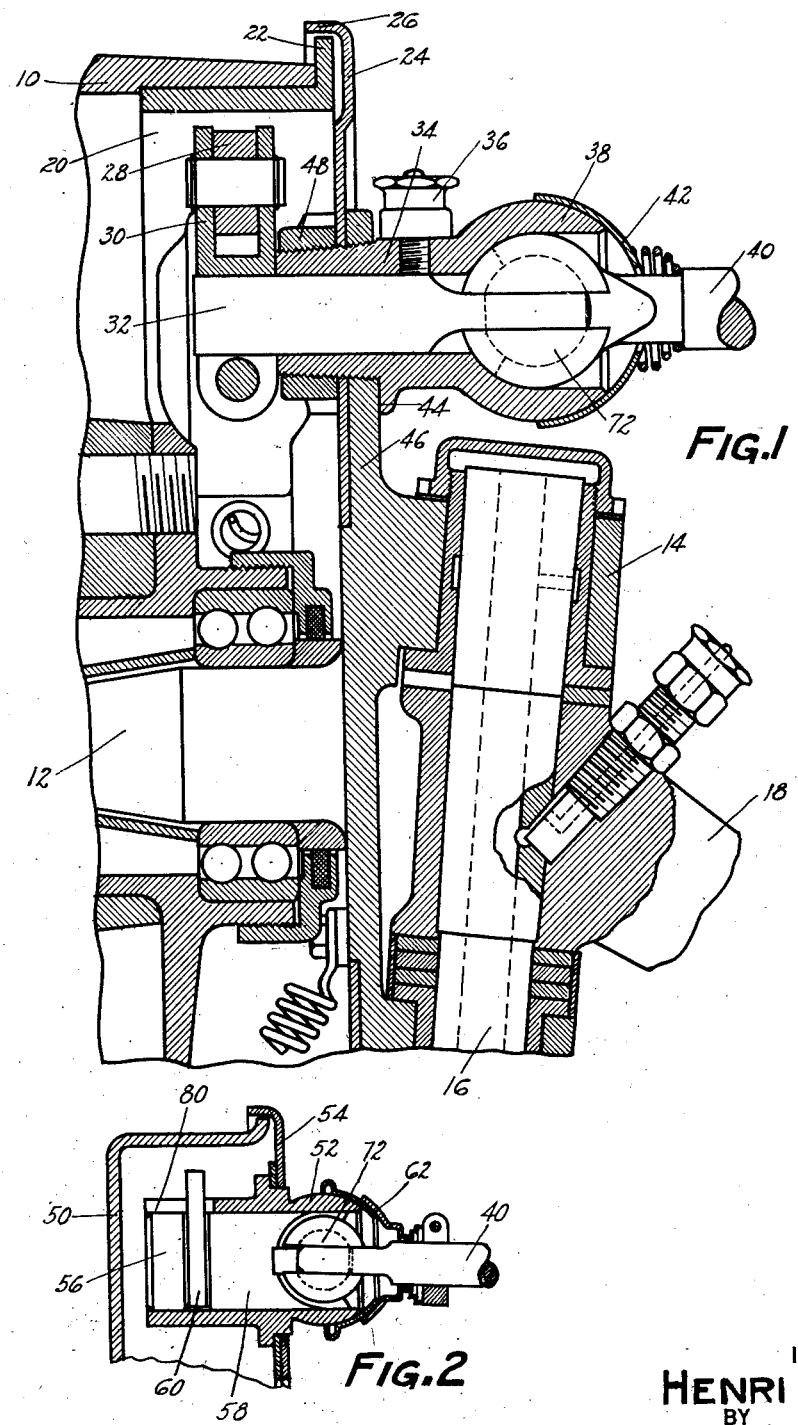
Fig. 1 is a vertical section through the upper part of a brake and its associated parts.
Fig. 2 is a vertical section through the upper part of a different brake.
Figure 3:
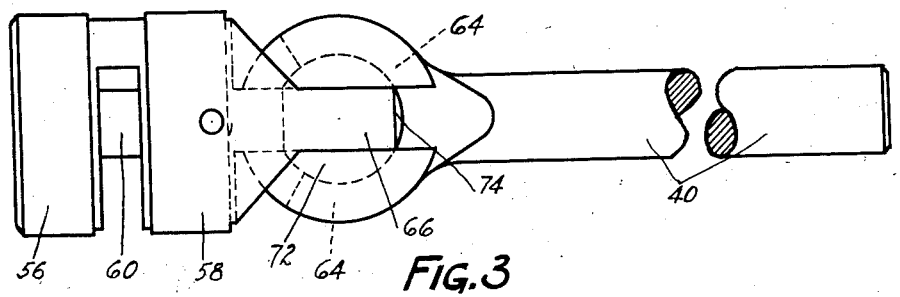
Fig. 3 is a top plan view of the entire brake control of Fig. 2.
Figure 4:
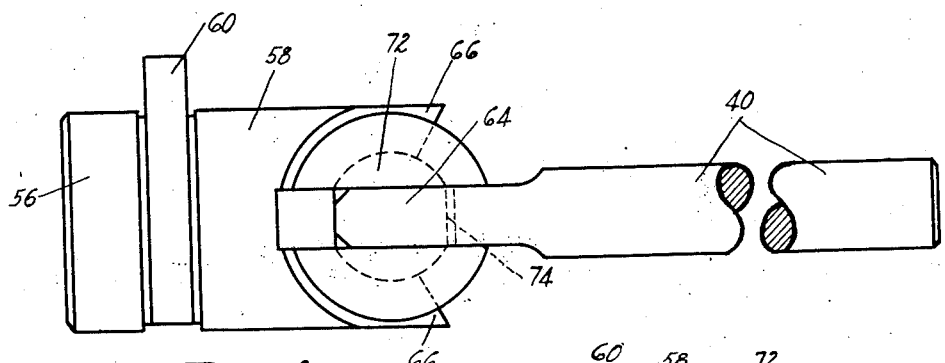
Fig. 4 is a side elevation of the brake control of Fig. 3.

The brake illustrated in Fig. 1 includes a novel drum 10, forming part of a wheel rotatably mounted on the spindle 12 of a knuckle 14 swivelled by a king pin 16 at one end of a front axle 18. The drum, which is preferably cast as part of the wheel, has a hardened steel liner 20, cylindrical in form, fitted inside of and secured to the cylindrical braking flange of the drum, and having at its inner edge a circular flange 22 engaging and projecting beyond the end edge of the braking flange. A backing plate 24 is provided with an outwardly-projecting flange 26 at its edge closely encircling the circular flange 22 and forming a tight housing for the brake.

The brake itself may be of any desired construction, as for example that described and claimed in my copending application No. 742,156, filed October 17, 1924. It is illustrated as applied by a thrust member 28 operated by arms 30 on a short shaft 32 journalled in a novel bearing 34 provided, if desired, with a lubricant fitting 36.

Bearing 34 has at its end an enlargement 38 formed with a socket for a universal joint through which shaft 32 is rocked to apply the brake by an operating shaft 40. The open end of the socket is closed by a semi-spherical cap 42 carried by shaft 40. Bearing 34 has an abutment 44 engaging a flange 46 extending from knuckle 14, and against which rests the backing plate 24. The bearing passes through alined openings in the flange 46 and the backing plate 24, and a nut 48 threaded on its inner end serves the double purpose of clamping the bearing in place and of clamping backing plate 24 to flange 46.

In the arrangement of Fig. 2, the drum 50 is pressed from sheet metal, and the bearing 52 is bolted or otherwise secured to the backing plate 54. In this case there is a unitary brake-applying device, preferably in one piece, and including cylindrical bearing or shaft portions 56 and 58, between which is a cam 60 projecting through a slot in the inner end of the bearing. In this case a pair of stampings 62 serve as a cap for the end of the bearing.

Shaft 40, and shaft 32 or shaft device 56—60 as the case may be, have pairs of projections or diverging arms 64 and 66, arranged at right angles to each other, and respectively received in circumferentially-extending grooves 68 and 70 in a novel spherical connecting member 72. The inner edges of projections 64 and 66 are curved on cylindrical arcs, and the bottoms of grooves 68 and 70 are correspondingly cylindrical, except that the bottoms are flattened at the intersections 74 of the grooves along chordal planes common to the two cylindrical arcs. Projections 64 and 66 extend further than 180°, so that the distance between their free extremities is greater by a slight clearance only than the perpendicular distance between the flattened intersections 74.

Figure 5:
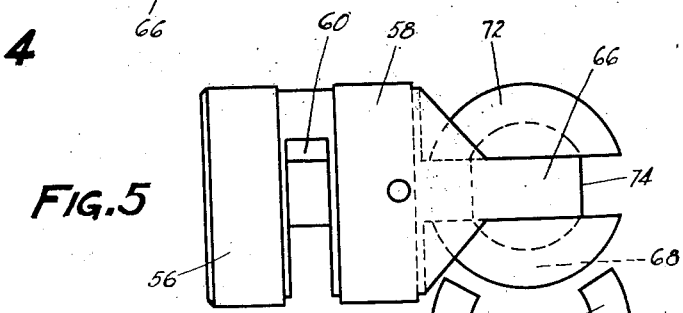
Fig. 5 is a top plan view of the control with the operating shaft detached.
Figure 6:
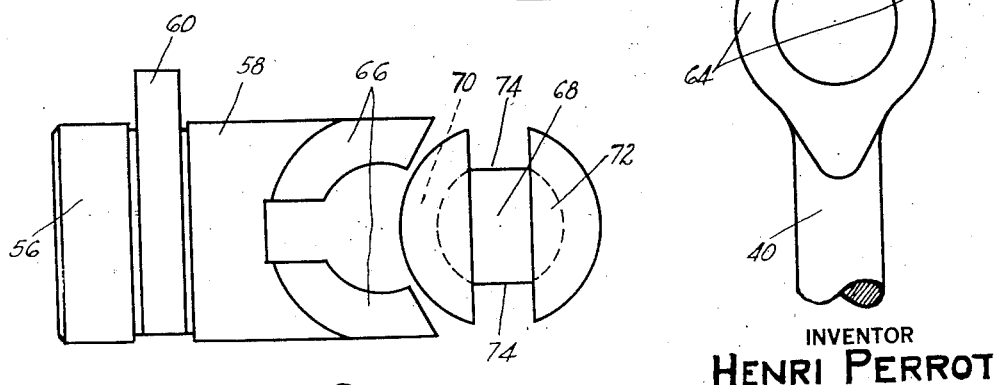
Fig. 6 is a side elevation of part of the control, showing the spherical connecting member detached.

The above-described flattening of the intersections permits shaft 40 to be removed as in Fig. 5, by turning it 90°, to bring the flattened intersections 74 in line with the free extremities of projections 64. Similarly shaft 32 or shaft device 56—60, as the case may be, may be separated from member 72 as in Fig. 6 by turning the latter 90° to bring the flattened intersections 74 in line with the free extremities of projections 66. The parts are assembled by reversing these steps.

Where shaft portions 56 and 58 and cam 60 are made in one piece, bearing 52 may have a slot 80 from its inner end for cam 60, and, if desired, this slot may be deepened a little at one side to permit the one-piece device to be moved axially to the right so that projections 66 extend beyond bearing 52, to facilitate assembling the universal joint. When assembled, and turned back to bring cam 60 to its active position, the cam holds the parts against axial movement to the right, while member 72 is interlocked with both pairs of projections 64 and 66.

The universal joint disclosed in Figures 3, 4, 5, and 6 is also disclosed and is claimed in my co-pending divisional application Serial No. 566,898, filed October 5, 1931.

While illustrative embodiments have been described in detail, it is not my intention to limit the scope of the invention to those particular embodiments, or otherwise than by the terms of the appended claims.

I claim:

1. A brake drum including a cylindrical braking flange and having a cylindrical liner secured to the inner face of the braking flange, the liner having an outwardly-extending circular flange at its inner edge engaging the end edge of and projecting beyond the braking flange.

2. Operating mechanism for a brake comprising, in combination, a bearing having an enlargement at one end formed with a socket, a brake-applying shaft journalled in the bearing and having a pair of diverging curved arms in the socket, an operating shaft extending into the open side of the socket and having a pair of diverging arms in the socket at right angles to the first pair of arms, the inner edges of each pair of arms being on cylindrical arcs extending more than 180°, and a connecting spherical member in the socket having two circumferential grooves at right angles to each other and formed with cylindrical bottom surfaces, one pair of said arms being received in each groove, and the bottoms of the two grooves being flattened at their two intersections along the common chordal plane of the two cylindrical bottoms to permit assembly and dismounting as described.

In testimony whereof, I have hereunto signed my name.

HENRI PERROT.